(12) United States Patent
Yen et al.

(10) Patent No.: US 7,064,744 B2
(45) Date of Patent: Jun. 20, 2006

(54) OPTICAL INDUCTION/TRACKBALL DUAL-MODE MOUSE

(75) Inventors: Kuei-Jen Yen, Tucheng (TW); Xiw-Jie Peng, Houlong (TW); Dong-Liang Chen, Sansia (TW)

(73) Assignee: Forward Electronics Co., Ltd., Taipei (TW)

( * ) Notice: Subject to any disclaimer, the term of this patent is extended or adjusted under 35 U.S.C. 154(b) by 278 days.

(21) Appl. No.: 10/825,160

(22) Filed: Apr. 16, 2004

(65) Prior Publication Data

US 2004/0207543 A1    Oct. 21, 2004

(30) Foreign Application Priority Data

Apr. 18, 2003    (TW) ............................. 92206186 U

(51) Int. Cl.
*G09G 5/08*    (2006.01)
(52) U.S. Cl. ................. 345/157; 345/161; 345/167; 341/31
(58) Field of Classification Search ............ 341/22–34; 345/156–167
See application file for complete search history.

(56) References Cited

U.S. PATENT DOCUMENTS

| | | | | |
|---|---|---|---|---|
| 6,377,244 | B1* | 4/2002 | Reid et al. ................... | 345/163 |
| 6,677,929 | B1* | 1/2004 | Gordon et al. ............... | 345/156 |
| 6,727,887 | B1* | 4/2004 | Levine et al. ................ | 345/158 |
| 2004/0130531 | A1* | 7/2004 | Cheng ......................... | 345/163 |
| 2005/0104854 | A1* | 5/2005 | Su et al. ...................... | 345/163 |

* cited by examiner

*Primary Examiner*—Timothy Edwards, Jr.
(74) *Attorney, Agent, or Firm*—Bacon & Thomas

(57) ABSTRACT

An optical induction/trackball dual-mode mouse is disclosed to include a mouse body, a trackball module installed in the top of the mouse body, a cursor control optical induction module installed in the bottom of the mouse body, and an induction switch mounted inside the mouse body, the induction switch adapted to switch to use the cursor control optical induction module when the mouse body is put on a flat surface, and the induction switch adapted to switch to use the trackball module when the user holding the mouse body in midair.

2 Claims, 3 Drawing Sheets

OPTICAL INDUCTION/TRACKBALL DUAL-MODE MOUSE

BACKGROUND OF THE INVENTION

1. Field of the Invention

The present invention relates to a mouse for use with a computer for data input and more particularly, to an optical induction/trackball dual-mode mouse that can be used on a flat surface as well as in midair.

2. Description of Related Art

Following fast development of computer and network industries, manufacturers are continuously designing advanced mice with added functions for better performance. Conventional mice may be designed specifically for use on a flat surface or in midair. Consumers cannot obtain a mouse that is practical for use on a flat surface as well as in midair.

According to conventional designs, a mouse has only one operation mode, i.e., it must be used on a flat surface or can only be used in midair. However, when using a particular software to prepare document or to make engineering processing works, it requires a mouse for fast control on a flat surface; when browsing the Internet, it requires an orthopedically engineered mouse for comfort hand operation control. A mouse for use on a flat surface is practical for fast control, however the body of the user using this kind of mouse aches soon after a long use. It is comfortable to use a mouse in midair, however it is inconvenient to control a mouse designed for use in midair.

SUMMARY OF THE INVENTION

The present invention has been accomplished under the circumstances in view. It is therefore the main object of the present invention to provide an optical induction/trackball dual-mode mouse, which is orthopedically engineered for use on a flat surface as well as in midair.

To achieve this and other objects of the present invention, the optical induction/trackball dual-mode mouse is comprised of a mouse body, a trackball module, a cursor control optical induction module, and an induction switch. The mouse body has a top and a bottom. The trackball module is mounted in the top of the mouse body. The cursor control optical induction module is installed in the bottom of the mouse body. The induction switch is mounted inside the mouse body.

When put the optical induction/trackball dual-mode mouse on an interface, for example, the top surface of a table, the induction switch adapted to switch to use the cursor control optical induction module automatically, for enabling the user to operate the cursor control optical induction module. When holding the optical induction/trackball dual-mode mouse in midair, the induction switch adapted to switch to use the trackball module automatically, for enabling the user to operate the trackball module.

Therefore, by means of auto induction action of the induction switch, the mouse body can be put on a flat surface, for enabling the user to use the cursor control optical induction module for data input. Alternatively, the user can hold the mouse body in midair and use the trackball module for data input. In general, the optical induction/trackball dual-mode mouse can be used on a flat surface as well as in midair. Further, the mouse body can be orthopedically engineered for a comfort use.

The aforesaid induction switch is comprised of a light emitting diode and a phototransistor. When putting the bottom of the mouse body in contact with a flat surface, the flat surface reflects the light of the light emitting diode onto the phototransistor, thereby causing the induction switch to switch to use the cursor control optical induction module automatically. When holding the mouse body in midair, the phototransistor receives no signal from the light emitting diode, thereby causing the induction switch to switch to use the trackball module automatically.

DETAILED DESCRIPTION OF THE PREFERRED EMBODIMENT

Figure 1:
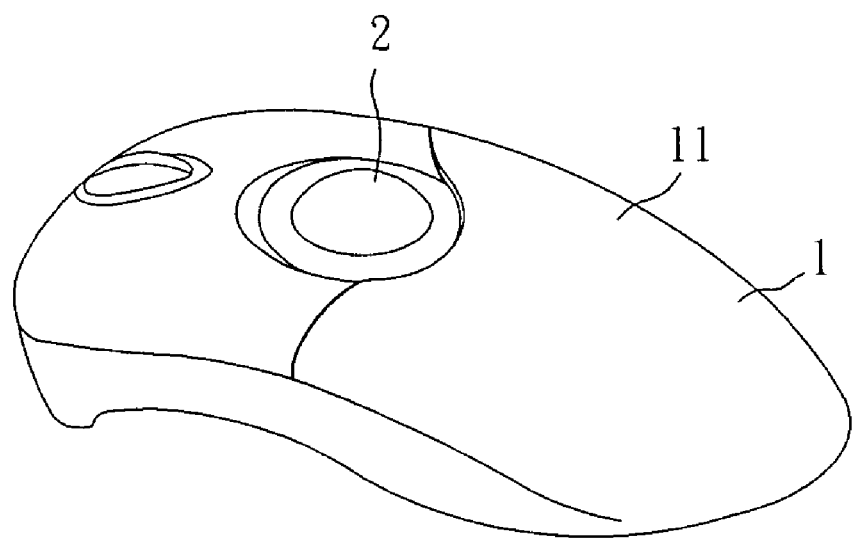
FIG. 1 is an oblique top elevation of an optical induction/trackball dual-mode mouse according to the present invention.
Figure 2:
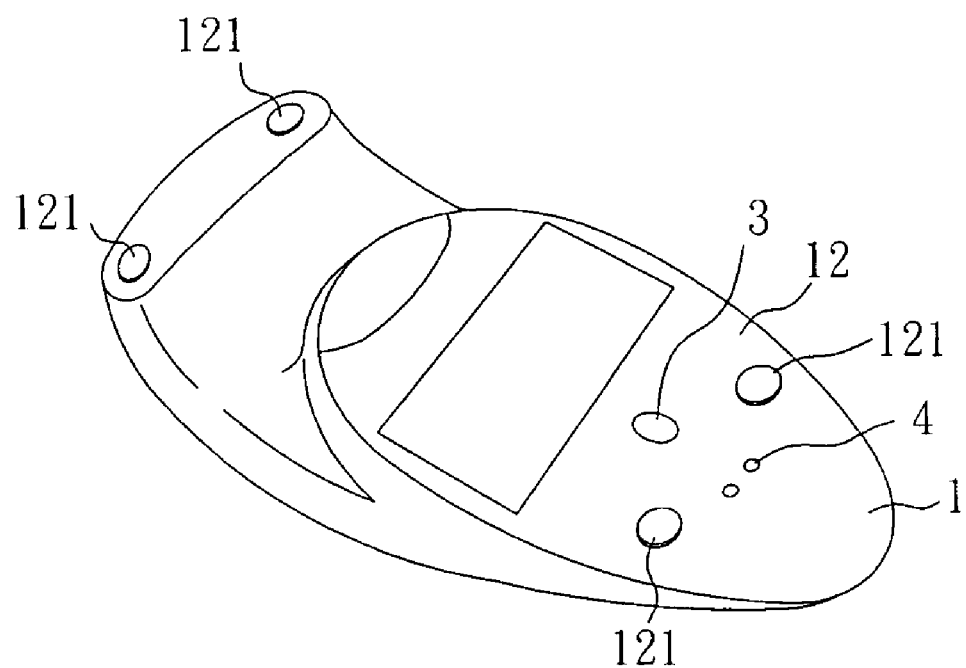
FIG. 2 is an oblique bottom elevation of the optical induction/trackball dual-mode mouse according to the present invention.

Referring to FIGS. 1 and 2, an optical induction/trackball dual-mode mouse in accordance with the present invention is shown comprised of a mouse body 1, a trackball module 2, a cursor control optical induction module 3, and an induction switch 4. The mouse body 1 has a top 11, a bottom 12, and four contacts 121 at the bottom 12.

Further, the trackball module 2 is mounted in the top 11 of the mouse body 1; the cursor control optical induction module 3 is installed in the bottom 12 of the mouse body 1; the induction switch 4 is mounted inside the mouse body 1. The induction switch 4 comprises a LED (light emitting diode) 41, and a phototransistor 42 adapted to receive the light from the LED 41.

Figure 3:
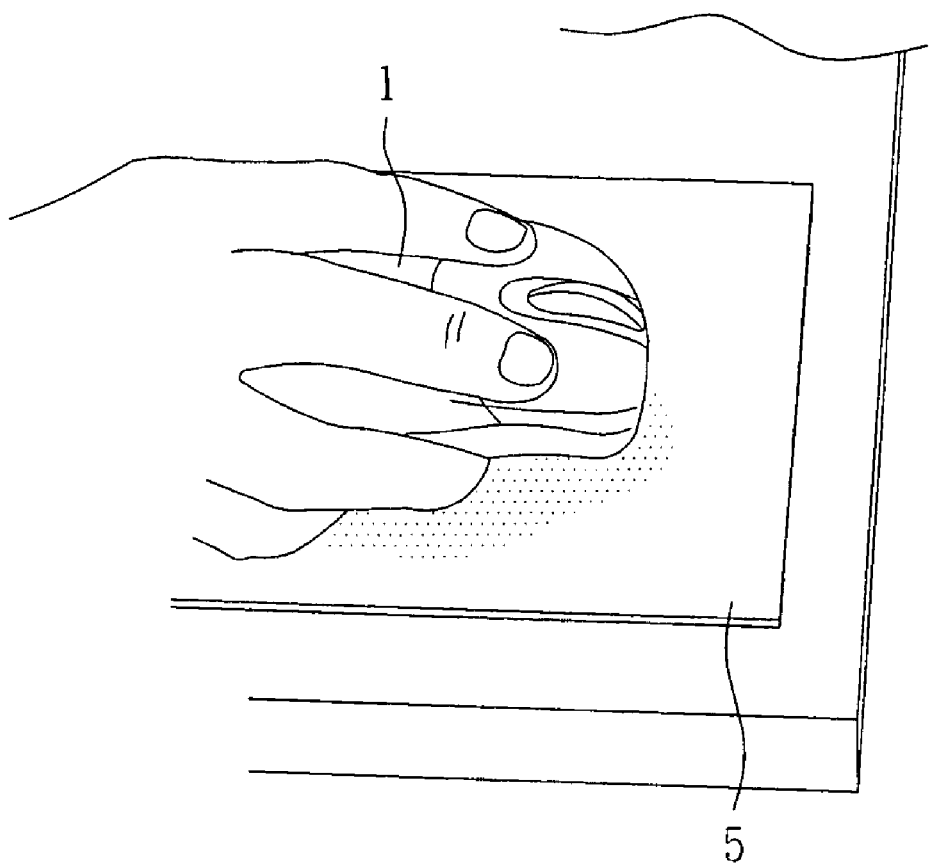
FIG. 3 is a schematic drawing showing one application example of the present invention where the mouse body is put on the top surface of a table.
Figure 4:
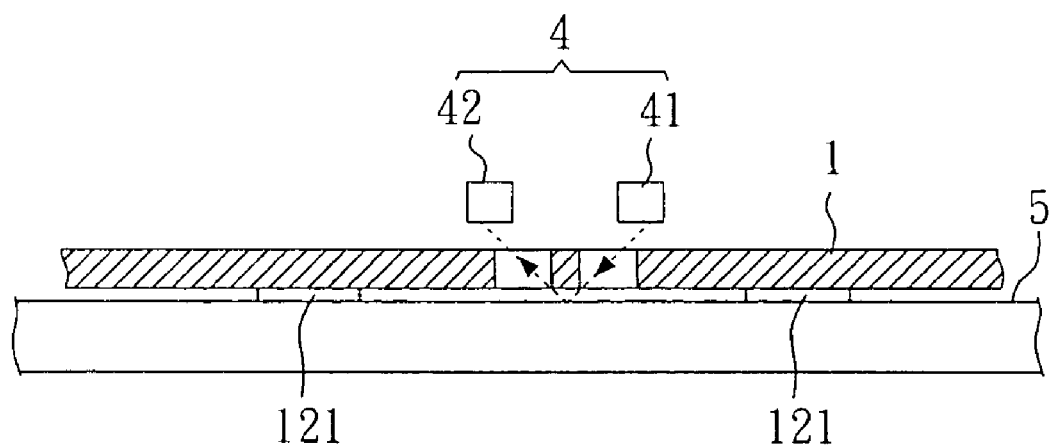
FIG. 4 is a sectional view in an enlarged scale of a part of FIG. 3.

Referring to FIGS. 3 and 4 and FIG. 2 again, when put the optical induction/trackball dual-mode mouse on an interface 5, for example, the top surface of a table, the four contacts 121 at the bottom 12 of the mouse body 1 are kept in contact with the interface 5. At this time, the interface 5 reflects the light of the LED 41 of the induction switch 4 onto the phototransistor 42, thereby causing the induction switch 4 to switch to use the cursor control optical induction module 3 automatically.

Figure 5:
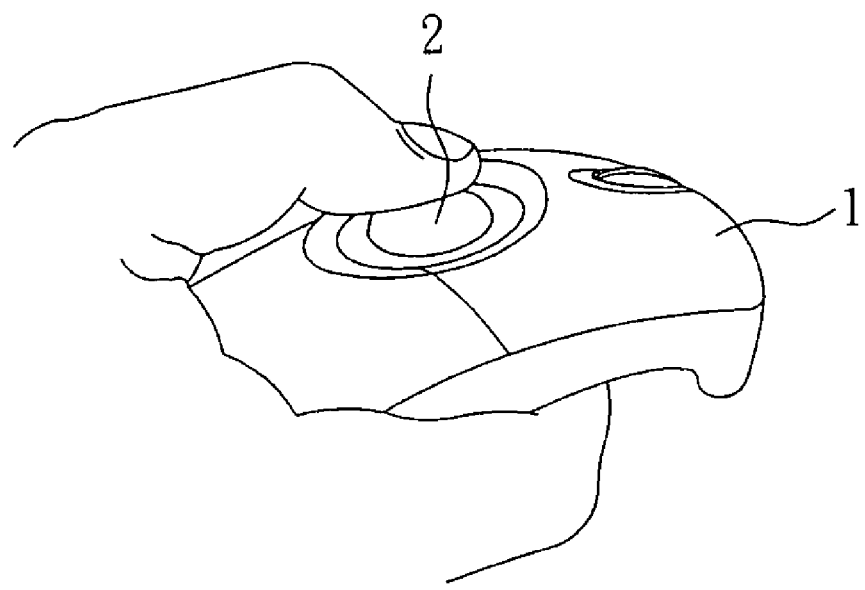
FIG. 5 is a schematic drawing showing another application example of the present invention where the mouse body is held in midair.
Figure 6:
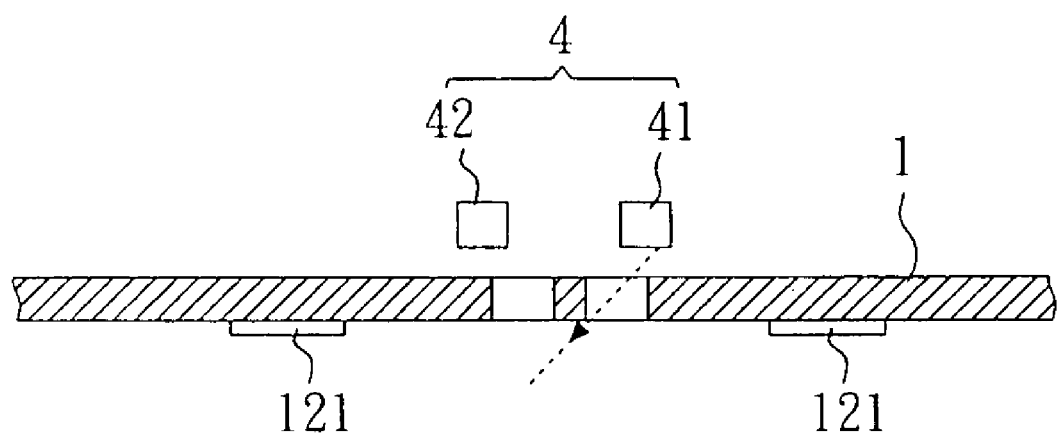
FIG. 6 is sectional view in an enlarged scale of a part of FIG. 5.

Referring to FIGS. 5 and 6, when suspending the optical induction/trackball dual-mode mouse in midair, the bottom 12 of the mouse body 1 is held in midair. At this time, the phototransistor 42 of the induction switch 4 receives no signal from the LED 41, thereby causing the induction switch 4 to switch to use the trackball module 2 automatically.

As indicated above, by means of auto induction action of the induction switch 4, the mouse body 1 can be put on an interface (the top surface of a table) 5, for enabling the user to use the cursor control optical induction module 3 to control positioning of the cursor. Alternatively, the user can hold the mouse body 1 in midair and use the trackball module 2 to control positioning of the cursor. In general, the optical induction/trackball dual-mode mouse can be used on a flat surface as well as in midair. Further, the mouse body can be orthopedically engineered for a comfort use.

Although the present invention has been explained in relation to its preferred embodiment, it is to be understood that many other possible modifications and variations can be made without departing from the spirit and scope of the invention as hereinafter claimed.

What is claimed is:

1. an optical induction/trackball dual-mode mouse comprising:
    a mouse body, said mouse body having a top and a bottom;
    a trackball module installed in the top of said mouse body;
    a cursor control optical induction module installed in the bottom of said mouse body; and
    an induction switch mounted inside said mouse body and adapted to switch operation of said mouse to said cursor control optical induction module automatically when bottom of said mouse body is in contact with a surface, and to switch operation to said trackball module automatically, enabling the user to operate the trackball module, when the bottom of said mouse body is suspended in midair.

2. The optical induction/trackball dual-mode mouse as claimed in claim 1, wherein said induction switch is comprised of a light emitting diode and a phototransistor.

* * * * *